US011421551B2

(12) United States Patent
Joshi et al.

(10) Patent No.: US 11,421,551 B2
(45) Date of Patent: Aug. 23, 2022

(54) TURBINE BEARING SUPPORT

(71) Applicant: GENERAL ELECTRIC COMPANY, Schenectady, NY (US)

(72) Inventors: Akash Joshi, Bangalore (IN); Ravindra Shankar Ganiger, Bangalore (IN); Vidyashankar Ramasastry Buravalla, Bangalore (IN); Shuvajyoti Ghosh, Bangalore (IN); Shivaram A C, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 862 days.

(21) Appl. No.: 16/099,775

(22) PCT Filed: May 23, 2017

(86) PCT No.: PCT/US2017/033910
§ 371 (c)(1),
(2) Date: Nov. 8, 2018

(87) PCT Pub. No.: WO2017/205315
PCT Pub. Date: Nov. 30, 2017

(65) Prior Publication Data
US 2019/0178104 A1 Jun. 13, 2019

(30) Foreign Application Priority Data

May 25, 2016 (IN) .............................. 201641017921

(51) Int. Cl.
*F01D 25/16* (2006.01)
(52) U.S. Cl.
CPC ........ *F01D 25/164* (2013.01); *F05B 2240/54* (2013.01); *F05B 2280/107* (2013.01);
(Continued)

(58) Field of Classification Search
CPC .......... F01D 25/162; F01D 25/16–168; F01D 25/164; F05B 2240/54; F05B 2280/107;
(Continued)

(56) References Cited

U.S. PATENT DOCUMENTS 5,320,134 A 6/1994 Singh
6,325,546 B1 12/2001 Storace
(Continued)

FOREIGN PATENT DOCUMENTS

CN 2769611 Y 4/2006
EP 1409862 A1 2/2003
(Continued)

OTHER PUBLICATIONS

Indian Office Action Corresponding to Application No. 201641017921 dated Jul. 23, 2019.
(Continued)

*Primary Examiner* — Michael Lebentritt
*Assistant Examiner* — Julian B Getachew
(74) *Attorney, Agent, or Firm* — Dority & Manning, P.A.

(57) ABSTRACT

A gas turbine engine includes a compressor section and a turbine section arranged in serial flow order. A shaft is provided rotatable with at least a portion of the compressor section and with at least a portion of the turbine section. A bearing is also provided supporting rotation of the shaft, with a support element in turn supporting the bearing. The gas turbine engine also includes a superelastic member formed of a shape memory alloy supporting at least one of the support element or the bearing. The superelastic member is installed in a pre-stressed condition to enhance a dampening function of the superelastic member.

20 Claims, 9 Drawing Sheets

(52) U.S. Cl.
CPC .......... *F05B 2280/5001* (2013.01); *F05B 2280/5006* (2013.01); *F05D 2240/53* (2013.01); *F05D 2300/174* (2013.01); *F05D 2300/505* (2013.01); *Y02T 50/60* (2013.01)

(58) Field of Classification Search
CPC ...... F05B 2280/5001; F05B 2280/5006; F05D 2240/53; F05D 2300/174; F05D 2300/505
See application file for complete search history.

(56) References Cited

U.S. PATENT DOCUMENTS

| | | |
|---|---|---|
| 6,491,497 B1 | 12/2002 | Allmon et al. |
| 6,796,408 B2 | 9/2004 | Sherwin et al. |
| 7,004,047 B2 | 2/2006 | Rey et al. |
| 7,097,413 B2 | 8/2006 | VanDuyn |
| 8,136,999 B2 | 3/2012 | Mons et al. |
| 8,167,531 B2 | 5/2012 | Mollmann et al. |
| 8,267,650 B2 | 9/2012 | Alam et al. |
| 8,291,710 B2 | 10/2012 | Webster |
| 8,403,634 B2 | 3/2013 | Arness et al. |
| 8,430,622 B2 | 4/2013 | Webster et al. |
| 8,662,756 B2 | 3/2014 | Care et al. |
| 8,709,176 B1 * | 4/2014 | DellaCorte ........... C22C 19/007 148/402 |
| 8,834,095 B2 | 9/2014 | Davis |
| 8,986,146 B2 | 3/2015 | Gallet |
| 9,140,137 B2 | 9/2015 | Mayer et al. |
| 9,546,570 B2 * | 1/2017 | Fletcher .................. F16C 19/54 |
| 2006/0269357 A1 | 11/2006 | Webb |
| 2008/0181763 A1 | 7/2008 | Webster et al. |
| 2009/0148274 A1 | 6/2009 | Kostka et al. |
| 2011/0150378 A1 | 6/2011 | Care et al. |
| 2013/0312419 A1 | 11/2013 | Merry et al. |
| 2014/0256504 A1 | 9/2014 | McCune et al. |
| 2015/0046061 A1 | 2/2015 | Copeland et al. |
| 2015/0144256 A1 | 5/2015 | Fabre et al. |
| 2016/0097331 A1 | 4/2016 | Venter et al. |

FOREIGN PATENT DOCUMENTS

| | | |
|---|---|---|
| EP | 2339131 A1 | 6/2011 |
| FR | 2938874 A1 | 11/2008 |

OTHER PUBLICATIONS

Chinese Search Report Corresponding to Application No. 201780031934 dated Oct. 17, 2020.

International Search Report and Written Opinion dated Sep. 11, 2017 which was issued in connection with PCT application No. PCT/US2017/033910 which was filed on May 23, 2017.

* cited by examiner

TURBINE BEARING SUPPORT

FIELD OF THE INVENTION

The present subject matter relates generally to a support system for a bearing within a turbine engine.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional gas turbine engines include rotor assemblies having shafts, couplings, sealing packs, and other elements required for optimal operation under given operating conditions. These rotor assemblies have a mass generating a constant static force due to gravity, and also generate a dynamic force due, e.g., to imbalances in the rotor assembly during operation. Such gas turbine engines include bearings to sustain and support these forces while permitting rotation of the rotor assembly.

Gas turbine engines additionally include dampers, such as squeeze film dampers to provide dampening of the loads on the bearings. However, under no-oil conditions, as well as during conditions in which the rotor assemblies are subjected to a large amount of dynamic forces, the squeeze film dampers may not provide a desired amount of dampening. Accordingly, a gas turbine engine having features for providing additional dampening for bearings during operation would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine includes a compressor section and a turbine section arranged in serial flow order. The gas turbine engine also includes a shaft rotatable with at least a portion of the compressor section and with at least a portion of the turbine section, a bearing supporting rotation of the shaft, and a support element supporting the bearing. Moreover, the gas turbine engine includes a superelastic member formed of a shape memory alloy supporting at least one of the support element or the bearing. The superelastic member is installed in a pre-stressed condition.

In another exemplary embodiment of the present, a support assembly is provided for a bearing supporting a shaft within a gas turbine engine. The support assembly includes a support element for supporting the bearing, a first damper for dampening loads on the bearing, and a superelastic member. The superelastic member is formed of a shape memory alloy and configured for supporting at least one of the support element or the bearing. The superelastic member is configured to be installed in a pre-stressed condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
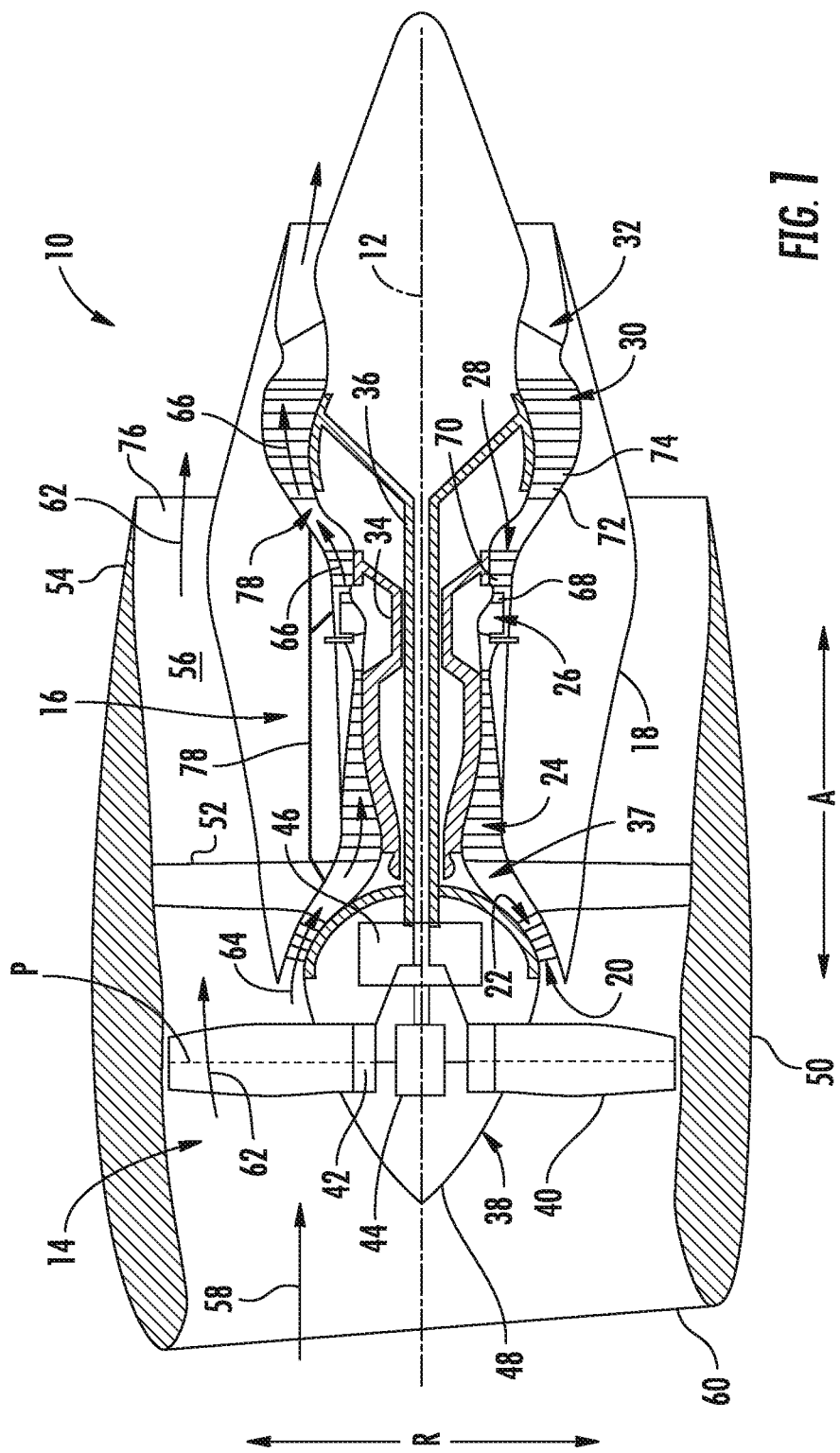
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. Accordingly, the turbofan engine 10 may be referred to as an ultra-high bypass turbofan engine. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
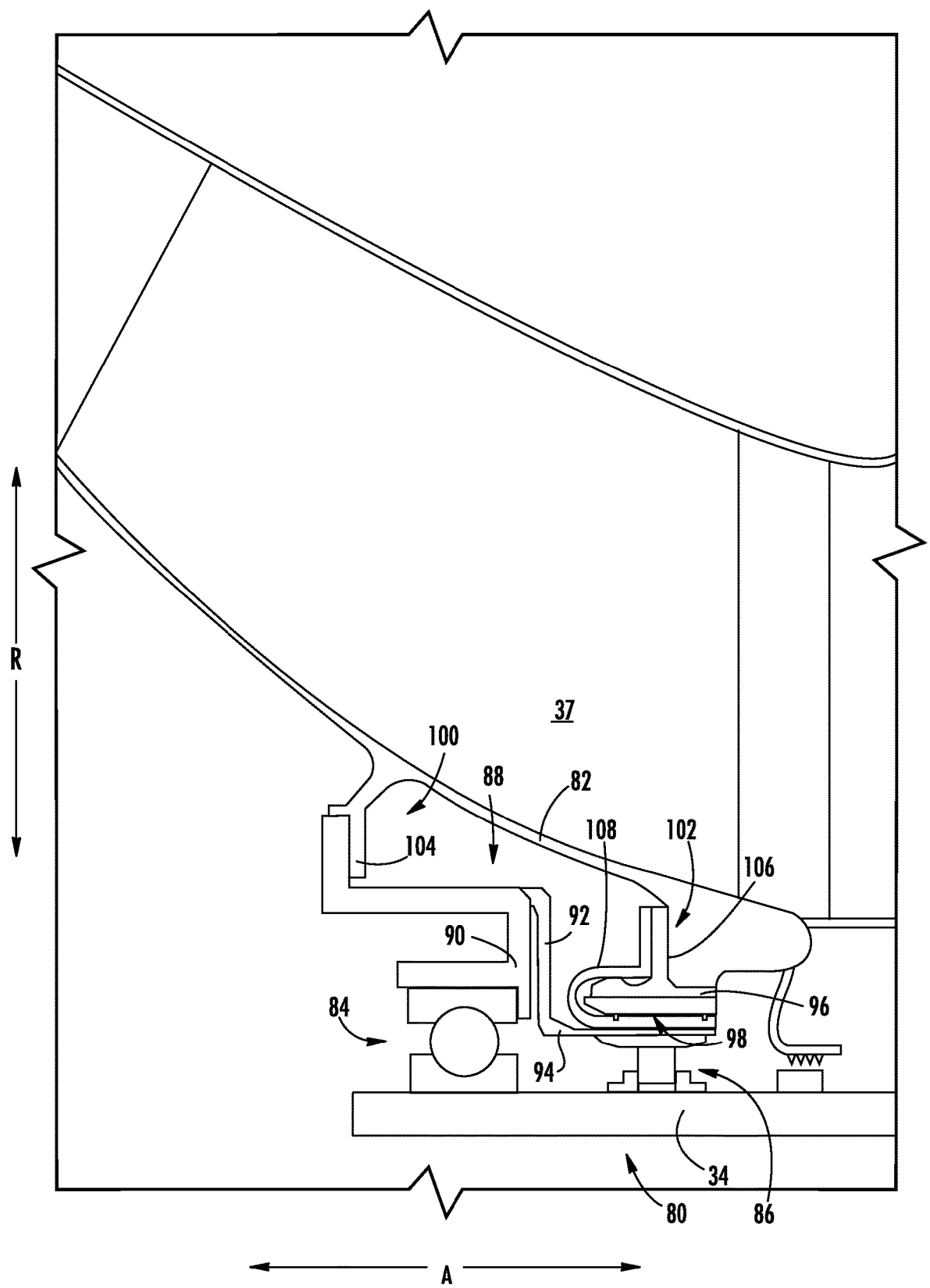
FIG. 2 is a close-up, schematic view of a compressor section of the exemplary gas turbine engine of FIG. 1.

Referring now to FIG. 2, a close-up view of a section of the compressor section of the exemplary turbofan engine 10 of FIG. 2 is provided. Specifically, FIG. 2 shows a forward end 80 of the HP shaft 34. The forward end 80 of the HP shaft 34 is positioned within the compressor section of the turbofan engine 10, radially inward of the core air flowpath 37. Notably, for the embodiment depicted, the core air flowpath 37 is defined at least in part by a static frame 82 within the compressor section of the turbofan engine 10. For the embodiment depicted, the static frame 82 is configured as a single piece unit, however in other embodiments, the static frame 82 may instead be formed of a plurality of members attached and configured in any suitable manner.

Referring still to FIG. 2, the turbofan engine 10 includes a bearing supporting rotation of the HP shaft 34 at the forward end 80. More particularly, the turbofan engine 10 includes a forward bearing 84 and an aft bearing 86, the forward and aft bearings 84, 86 each supporting rotation the HP shaft 34 at the forward end 80 of the HP shaft 34. For the embodiment depicted, the forward bearing 84 is configured as a ball bearing and the aft bearing 86 is configured as a roller element bearing. It should be appreciated, however, that in other embodiments, the forward and/or aft bearings 84, 86 may instead have any other suitable form or configuration. Further, in still other embodiments, the turbofan engine 10 may only include a single bearing for supporting the forward end 80 of the HP shaft 34.

The turbofan engine 10 additionally includes a support element 88 supporting the bearing, or rather for the embodiment depicted, supporting both the forward bearing 84 and the aft bearing 86. More particularly, the support element 88 depicted includes a plurality of individual ribs spaced along a circumferential direction C (see FIG. 6). The plurality of ribs include forward bearing support ribs 90 and aft bearing support ribs 92. Accordingly, for the embodiment depicted, the support element 88 is configured as, and may be referred to as a "squirrel casing" for the forward and aft bearings 84, 86. Additionally, for the embodiment depicted, the aft bearing support ribs 92 include an axial member 94 extending generally along the axial direction A for supporting the aft bearing 86. The ribs 90, 92 of the support element 88 may be formed of a metal material capable of bending or flexing during operation of the turbofan engine 10 to provide a certain amount of dampening for the forward and aft bearings 84, 86.

Figure 3:
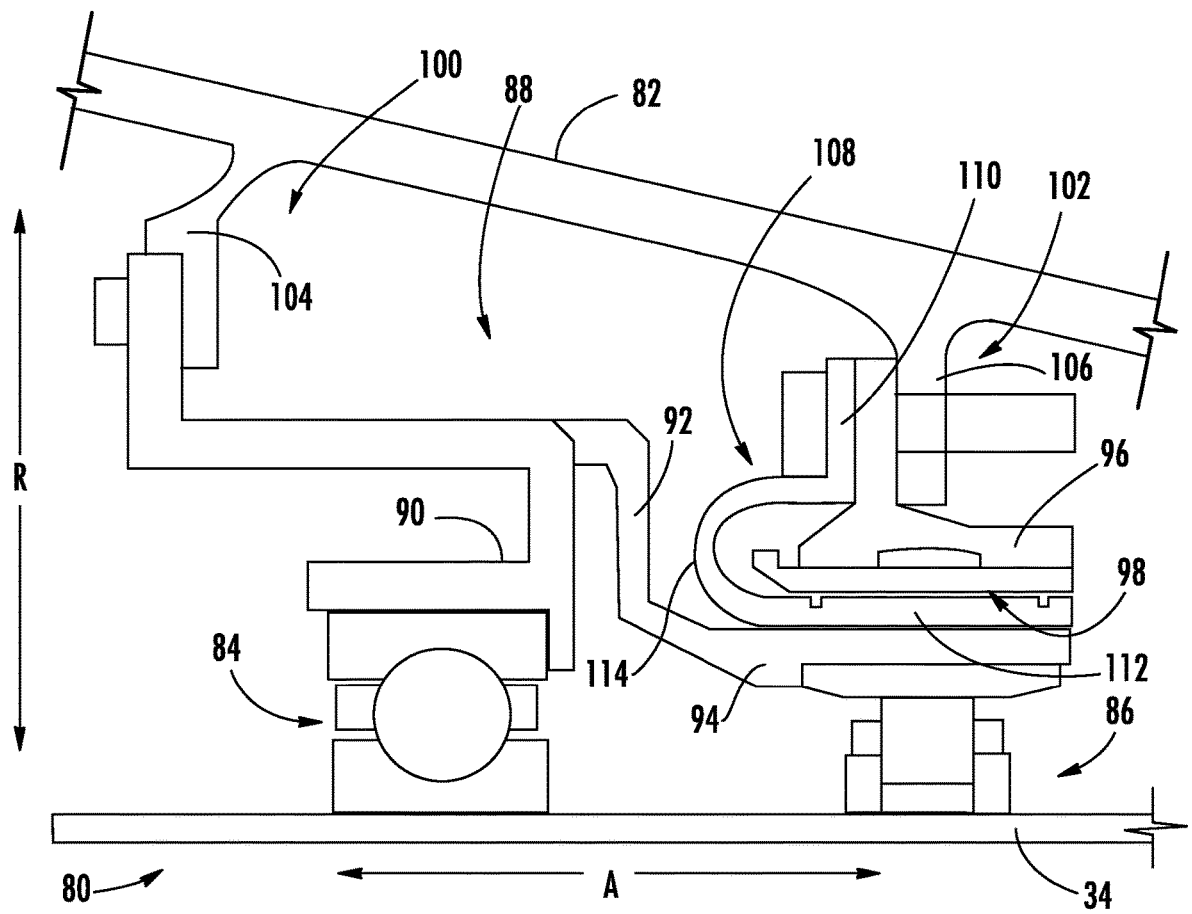
FIG. 3 is a close-up, schematic view of a support assembly in accordance with an exemplary embodiment of the present disclosure installed in the exemplary compressor section of FIG. 2.

Referring now also to FIG. 3, providing a close-up view of the forward and aft bearings 84, 86 of FIG. 2, the turbofan engine 10 further includes a first damper, or for the embodiment depicted, a squeeze film damper 96 for providing additional dampening of the aft bearing 86. As will be appreciated, the squeeze film damper 96 receives a flow of fluid, such as a lubrication oil, during operation. The squeeze film damper 96 provides such fluid to a support surface 98 to generate a thin film of such fluid. Dynamic forces acting on the HP shaft 34 and aft bearing 86 may be absorbed or dampened by squeezing out the fluid on the support surface 98. Notably, the support element 88 is attached to the static frame 82 at a first location 100 and, for the employment depicted, the squeeze film damper 96 is attached to the static frame 82 at a second location 102. More particularly, the support member is attached directly to a first attachment flange 104 of the static frame 82 at the first location 100 and the squeeze film damper 96 is attached directly to a second attachment flange 106 of the static frame 82 at the second location 102. The first location 100 is spaced from the second location 102. Specifically, for the embodiment depicted, the first location 100 is spaced from the second location 102 at least as far as the forward bearing 84 is spaced from the aft bearing 86.

It can be beneficial for gas turbine engines to include longer and/or thinner shafts, such as longer and/or thinner HP shaft 34 or LP shafts 36, to reduce a weight of the engine. However, such may lead to the shaft having a low bending stiffness and therefore large bow mode vibrations in response to dynamic forces acting thereon. For example, such may result in undesirably large whirl when experiencing dynamic forces, and may also result in the shaft rubbing against other components within the turbofan engine 10.

Accordingly, in order to address certain of these concerns, the support system of the present turbofan engine 10 further includes a superelastic member 108 formed of a shape memory alloy supporting at least one of the support element 88 or a bearing, such as the forward bearing 84 or aft bearing 86. Further, as will be discussed in greater detail below, the superelastic member 108 is installed in a pre-stressed condition.

Figure 11:
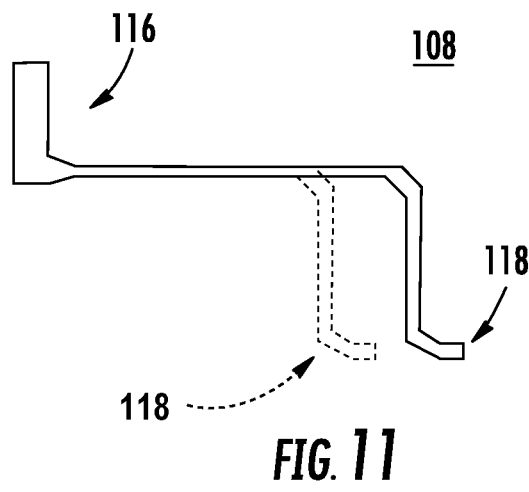
FIG. 11 is an isolated, side view of the exemplary superelastic member of FIG. 10 in a pre-stressed condition, with a relaxed position depicted in phantom.

For the embodiment depicted, the superelastic member 108 is attached to the static frame 82, also at the second location 102, and supports the aft bearing 86. As will be appreciated, for the embodiment depicted the superelastic member 108 is attached to the second attachment flange 106 of the static frame 82 at the second location 102 through the squeeze film damper 96. However, in other embodiments, the squeeze film damper 96 may instead be attached to the second attachment flange 106 of the static frame 82 through the superelastic member 108, or alternatively, each of the squeeze film damper 96 and superelastic member 108 may be attached directly to the second attachment flange 106 of the static frame 82 at the second location 102 (e.g., at opposing sides of the second attachment flange 106 of the static frame 82 at the second location 102; see FIG. 11).

Further, the superelastic member 108 includes an attachment section 110 attached to the second attachment flange 106 of the static frame 82 at the second location 102, a support section 112 for supporting the aft bearing 86, and a bend section 114 extending between the attachment section 110 and the support section 112. As stated above, the support element 88 supports the aft bearing 86 and includes the axial member 94 (of the aft bearing support ribs 92) positioned adjacent to the aft bearing 86. The support section 112 of the superelastic member 108 is positioned adjacent to the support element 88 (or more particularly adjacent to the axial member 94 of the support element 88), such that the superelastic member 108 (or more particularly the support section 112 of the superelastic member 108) supports the aft bearing 86 through the support element 88.

Additionally, as is also depicted, for the embodiment of FIGS. 2 and 3, the support section 112 of the superelastic member 108 is positioned between the squeeze film damper 96 and the bearing, or more particularly, between the squeeze film damper 96 and the axial member 94 of the support element 88. Accordingly, for the embodiment depicted, the superelastic member 108 and squeeze film damper 96 may act in series to support the aft bearing 86.

Figure 4:
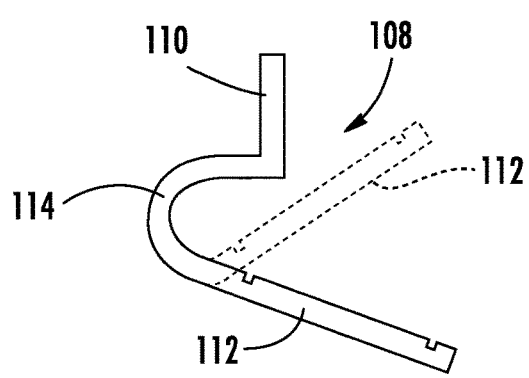
FIG. 4 is an isolated, side view of a superelastic member in accordance with an exemplary embodiment of the present disclosure in a relaxed position.
Figure 5:
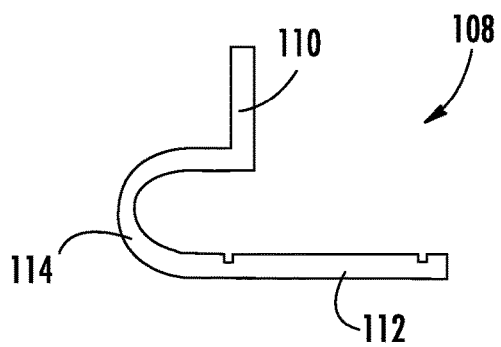
FIG. 5 is an isolated, side view of the exemplary superelastic member of FIG. 4 in a pre-stressed condition.

Referring now also to FIGS. 4 and 5, isolated views of the superelastic member 108 are provided. FIG. 4 provides a view of the superelastic member 108 prior to installation, in a relaxed or non-stressed position; and FIG. 5 provides a view of the superelastic member 108 after installation, in a pre-bent or pre-stressed condition. As is depicted, once installed and in the pre-stressed condition, the bend section 114 is bent from a relaxed, non-stressed positioned to substantially define a U-shape. Notably, FIG. 4 depicts in phantom an alternate relaxed or non-stressed position of the superelasitic member 108. Therefore, the pre-stressed condition may also be referred to as the pre-bent position, or pre-tensioned position. It should be appreciated, that although FIGS. 4 and 5 depict relatively large displacements of the support section 112 to place the superelastic member 108 in the pre-stressed position, in certain embodiments, the support section 112 may only be required to be bent a relatively small amount to attain the desired pre-stressed position. For example, in certain embodiments, the support member 112 may be moved at least four (4) degrees relative to the relaxed position, such as at least five (5) degrees, to attain the desired pre-stressed position. However, in other embodiments, the support member 112 may further be moved any suitable amount to attain the desired pre-stressed position. With such a configuration, the superelastic member 108 provides a force along the radial direction R of the turbofan engine 10 towards the centerline axis 12 (see FIG. 1) of the turbofan engine 10 during normal operations. Accordingly, such a configuration may assist with providing dampening of the bearing, e.g., along the radial direction R, during operation of the turbofan engine 10, such that the bearing may support increased dynamic forces on the HP shaft 34.

Figure 6:
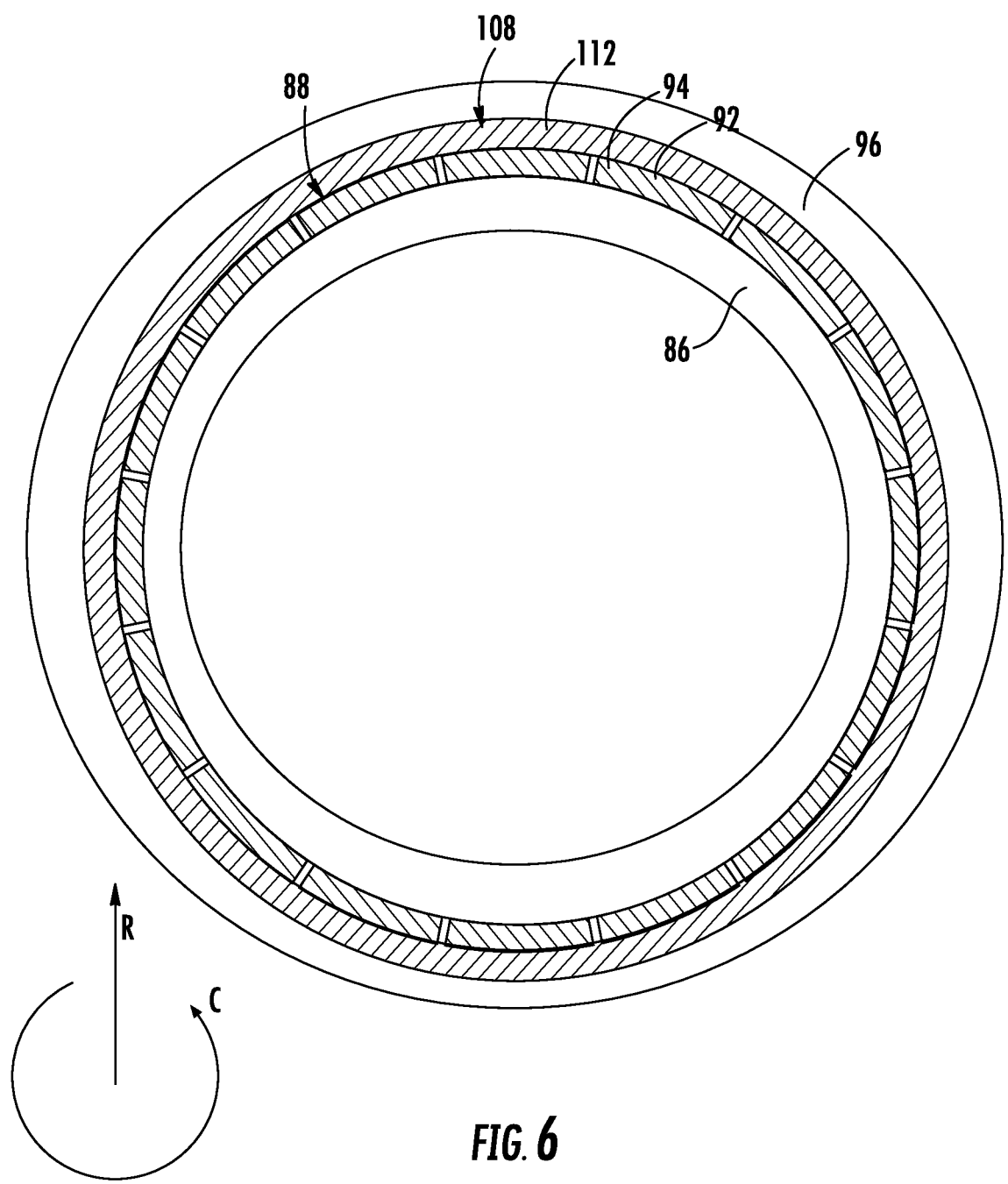
FIG. 6 is an axial, cross-sectional view of the exemplary support assembly of FIG. 3.

Referring now also to FIG. 6, an axial view is provided of the aft bearing 86 and the plurality of members supporting the aft bearing 86. For example, FIG. 6 depicts schematically the bearing 86, the support element 88, the superelastic member 108, and the squeeze film damper 96. For the embodiment described herein with respect to FIGS. 2 through 6, the superelastic member 108 extends substantially continuously along the circumferential direction C, at least at the support section 112 and the attachment section 110. Notably, however, in certain embodiments, the superelastic member 108 may include a plurality of individual members spaced along the circumferential direction C as the bend section 114.

Notably, as discussed above, the superelastic member 108 is formed of a shape memory alloy material. The shape memory alloy material may, in certain embodiments, be alloys of nickel and/or titanium. For example the shape memory alloy material may be alloys of Ni—Ti, or Ni—Ti—Hf, or Ni—Ti—Pd or Ti—Au—Cu. For the embodiment depicted, the superelastic member 108 is formed entirely of a shape memory alloy material. However, in other embodiments, the superelastic member 108 may be a bimetallic member, such that at least a portion is formed of a different material. For example, in certain embodiments, the bend section 114 may be formed of a shape memory allow material and one or both of the attachment section 110 and support section 112 may be formed of a different material, such as a conventional metal material (e.g., steel, titanium, etc.).

Figure 7:
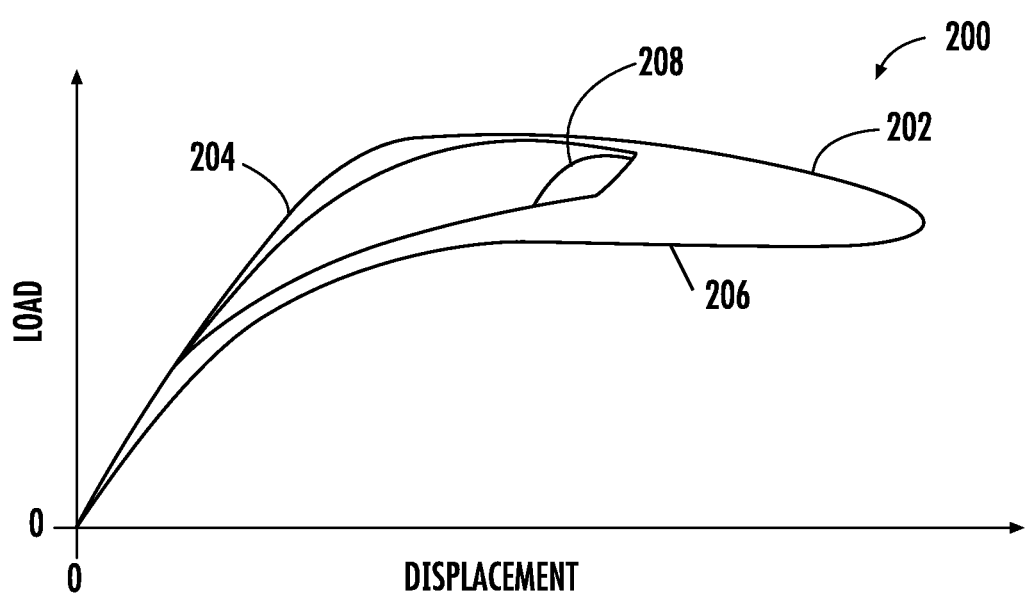
FIG. 7 is a plot depicting a load-deflection curve for a shape memory alloy material.

As will be appreciated, shape memory alloy presents non-linear behavior under mechanical stress, with this being due to a reversible austenite/martensite phase change taking place within a crystal lattice of the shape memory alloy material. For example, referring briefly to FIG. 7, a plot 200 is provided depicting a normal load-deflection curve 202 for a shape memory alloy. The load-deflection curve 202 follows a certain path 204 when stress is applied, and a different path 206 when the stress is relaxed. As the structure returns towards its initial shape as the stress is relaxed, the structure dissipates energy internally (hysteresis effect). Thus, when a shape memory alloy is subjected to repeated stresses, e.g., because of dynamic vibration, it dissipates energy by hysteresis on each stress cycle. Accordingly, utilizing a superelastic member 108 in accordance with an exemplary embodiment of the present disclosure formed of a shape memory alloy may dissipate energy in hysteresis to reduce undesirable vibration.

Further, installing the superelastic member 108 in the pre-stressed condition shifts the hysteresis cycle of a shape memory alloy superelastic member to a range of stresses that is different from that of a non-prestressed member. For example, referring again to plot 200, a load-deflection curve 208 is depicted for a prestressed shape memory alloy material. As depicted, the prestress serves to maximize the damping function of the shape memory alloy superelastic member 108 so that the material is active at the maximum stresses generated. More particularly, as will be appreciated, placing the superelastic member 108 in a pre-stress position may allow for the superelastic member 108 to enter a hysteretic bending regime, without requiring a relatively large amount of displacement.

Figure 8:
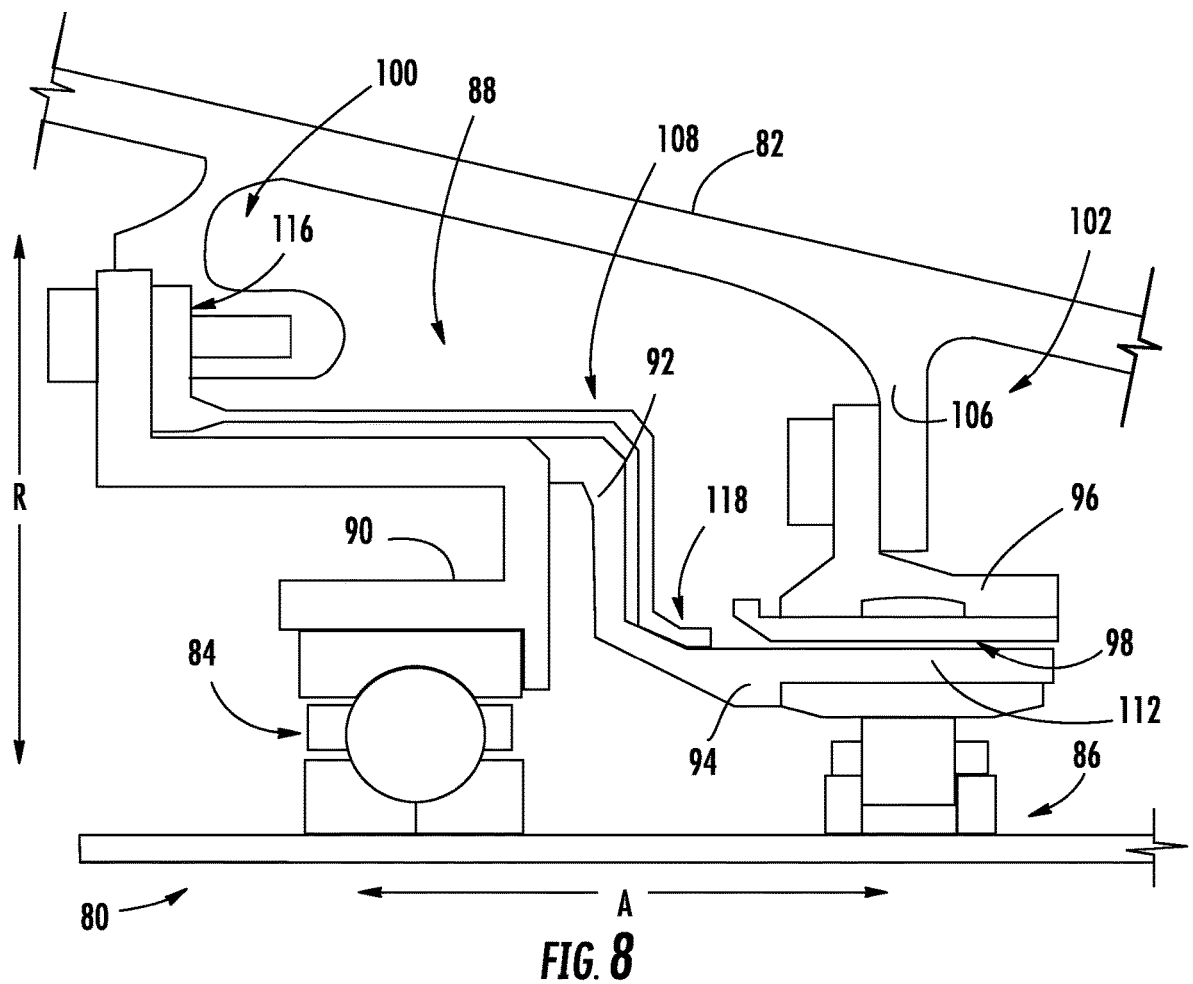
FIG. 8 is a close-up, schematic view of a support assembly in accordance with another exemplary embodiment of the present disclosure.
Figure 9:
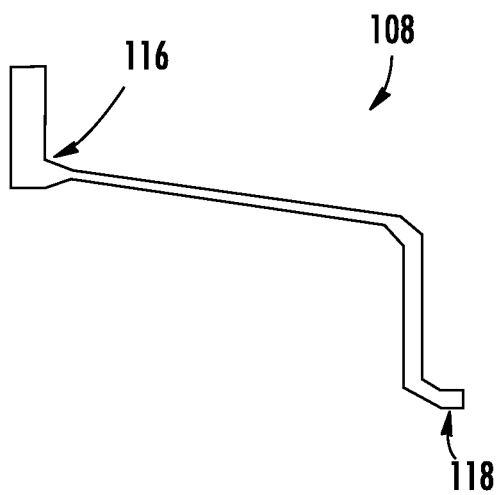
FIG. 9 is an isolated, side view of a superelastic member in accordance with another exemplary embodiment of the present disclosure in a relaxed position.
Figure 10:
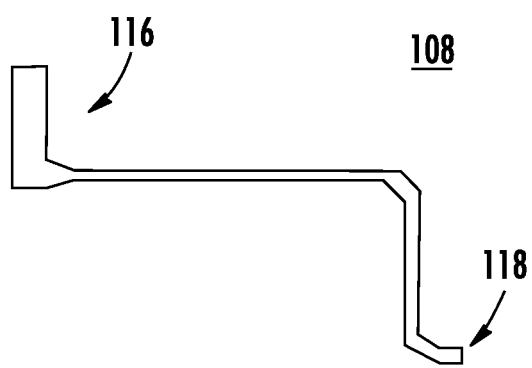
FIG. 10 is an isolated, side view of the exemplary superelastic member of FIG. 8 in a pre-stressed condition.

Referring now to FIGS. 8 through 10, it should be appreciated, that in other embodiments of the present disclosure, the superelastic member 108 may have any other suitable shape or configuration. For example, FIG. 8 depicts a close-up view of a compressor section of a turbofan engine 10 including a superelastic member 108 in accordance with another exemplary embodiment of the present disclosure. The turbofan engine 10 depicted in FIG. 8 may be configured in substantially the same manner as exemplary turbofan engine 10 described above with reference to FIGS. 2 and 3, and thus the same or similar numbering may refer to the same or similar part.

As is depicted, the turbofan engine 10 includes a forward bearing 84 and an aft bearing 86, each supporting the HP shaft 34. The forward and aft bearings 84, 86 are supported by a support element 88 attached to a first attachment flange 104 of a static frame 82 at a first location 100 of the static frame 82. Additionally, the aft bearing 86 is supported by a squeeze film damper 96 attached to a second attachment flange 106 of the static frame 82 at a second location 102 of the static frame 82, the second location 102 being spaced from the first location 100.

Also for the embodiment depicted, the turbofan engine 10 includes a superelastic member 108 formed of a shape memory alloy supporting at least one of the support element 88 or the bearing, and installed in a pre-stressed condition. More specifically, for the embodiment depicted, the superelastic member 108 is attached to the static frame 82 also at the first location 100 and supports the support element 88. More particularly, the superelastic member 108 for the embodiment depicted is also attached to the first attachment flange 104 of the static frame 82. As with the embodiment discussed above, the support element 88 includes an aft bearing support rib 92 having an axial member 94 extending generally along the axial direction A.

The superelastic member 108 extends between a first end 116, which is attached to the static frame 82 at the first location 100, and a second end 118. The second end 118 is positioned adjacent to the axial member 94 of the support element 88 for providing the axial member 94 of the support element 88 with a force along the radial direction R towards the centerline axis 12 during normal operations. Additionally, for the embodiment depicted, the superelastic member 108 is attached to the axial member 94 of the support element 88 at the second end 118. The superelastic member 108 may be attached using one or more bolts or other mechanical fastening members (not shown), or using any other suitable attachment method or mechanism.

Referring particularly to FIGS. 9 and 10, FIG. 9 provides an isolated view of the exemplary support element 88 of FIG. 8 in a non-stressed or relaxed position, before installation; and FIG. 10 provides an isolated view of the exemplary support element 88 of FIG. 8 in a pre-stressed or pre-bent position, after installation. As with the embodiment above, the superelastic member 108 is installed in the pre-bent position. Such a configuration may allow for the superelastic member 108 to provide an increased amount of resistance and dampening of dynamic forces on the HP shaft 34 translated through the aft bearing 86, as described in greater detail above.

Further, it should be appreciated that in still other embodiments, the superelastic member 108 may have any other suitable configuration for providing support/dampening to one or both of the support element 88 or a bearing, such as the forward bearing 84 or the aft bearing 86. For example, the bend section 114 of a superelastic member 108 may have any suitable shape. Additionally, referring now to FIG. 11, another exemplary embodiment of a superelastic member 108 as may be installed in the exemplary gas turbine engine of FIG. 8 is provided. A non-stressed or relaxed position, of the superelastic member 108 before installation is shown in phantom. When installed, the superelastic member 108 is put into a tensioned condition, such that the superelastic member is in a prestressed position.

Figure 12:
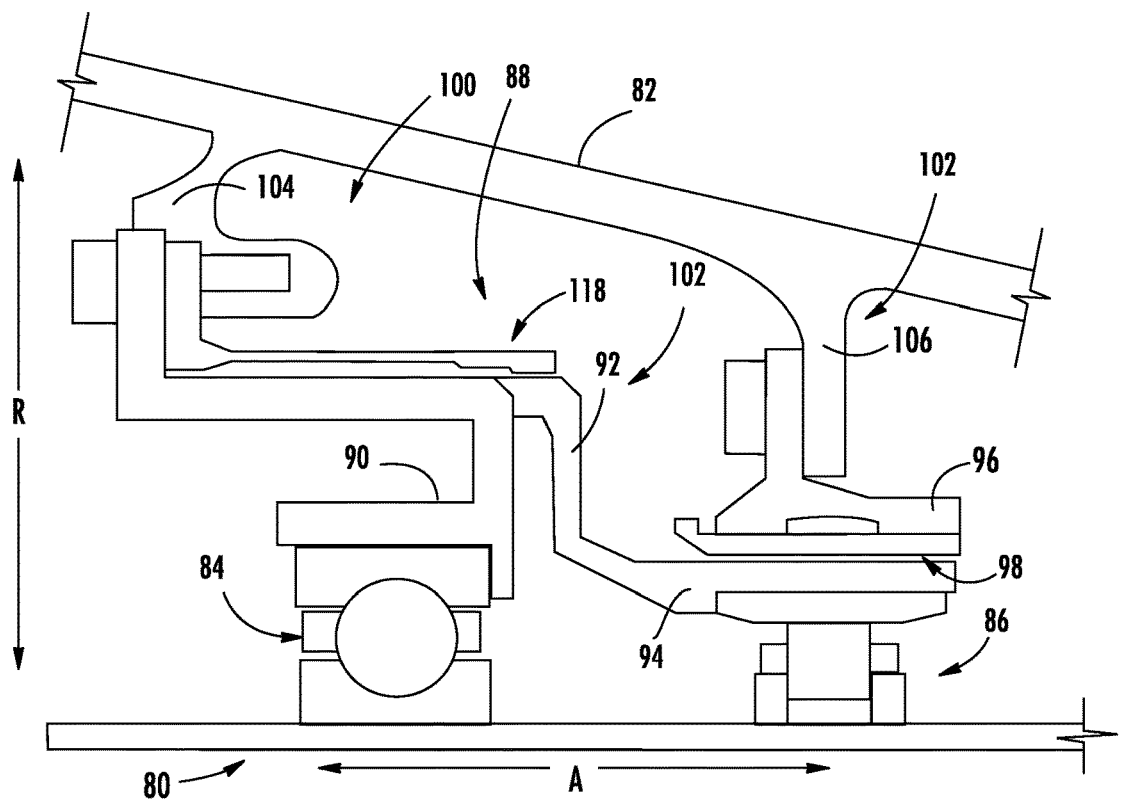
FIG. 12 is a close-up, schematic view of a support assembly in accordance with yet another exemplary embodiment of the present disclosure.
Figure 13:
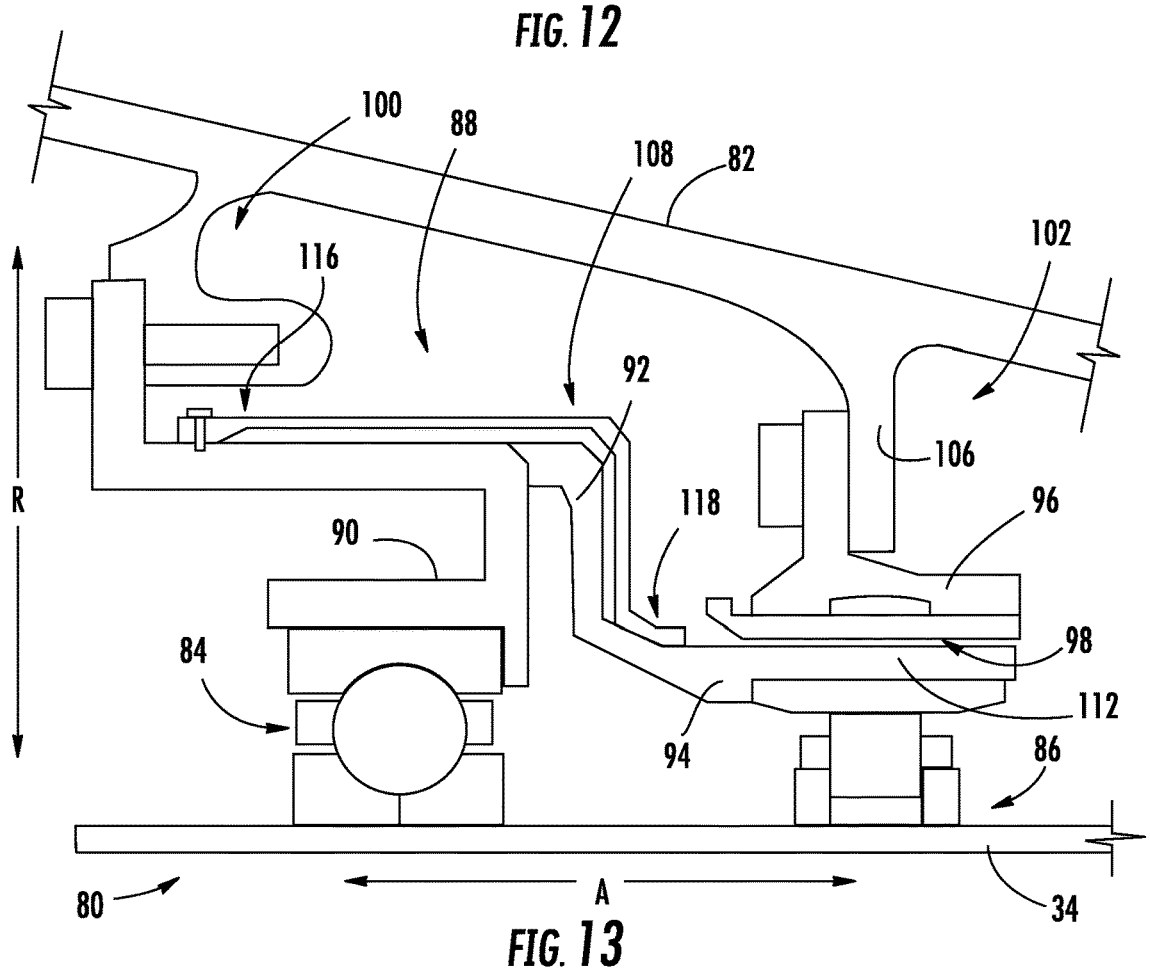
FIG. 13 is a close-up, schematic view of a support assembly in accordance with still another exemplary embodiment of the present disclosure.
Figure 14:
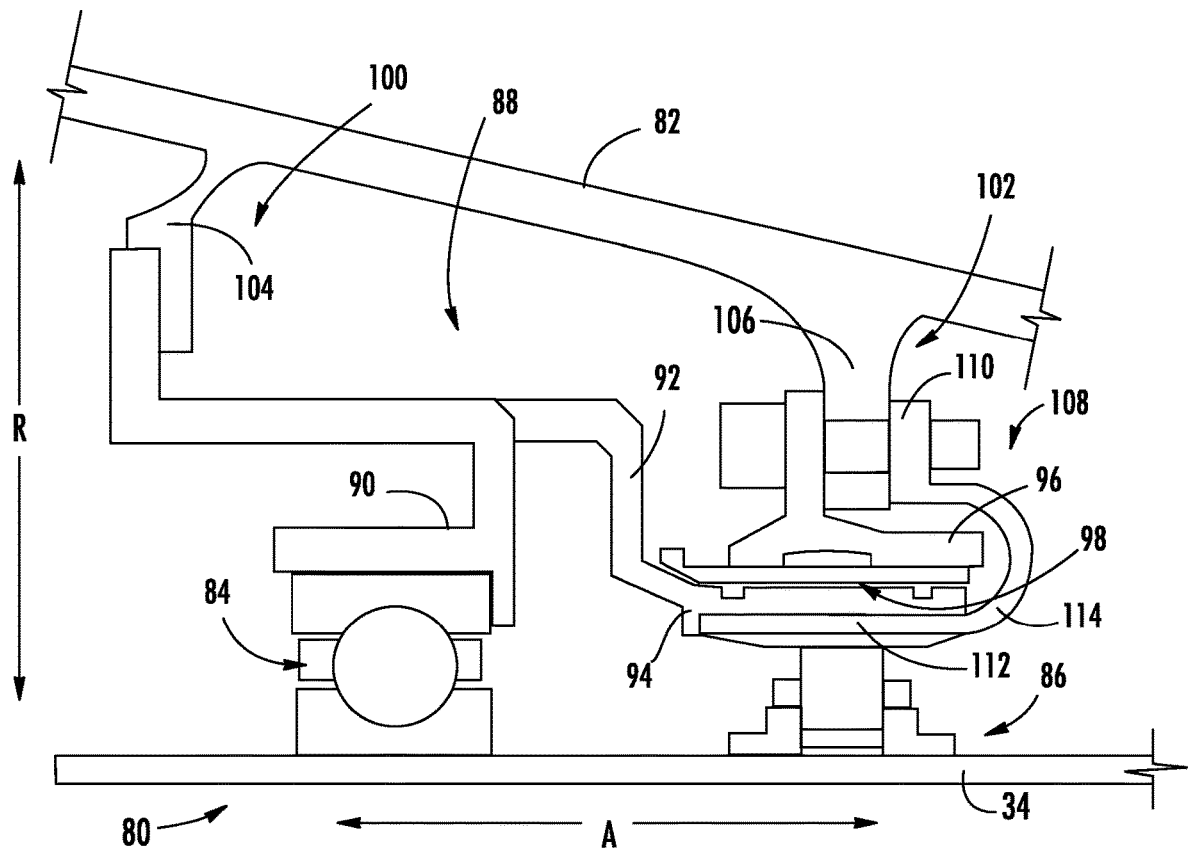
FIG. 14 is a close-up, schematic view of a support assembly in accordance with yet another exemplary embodiment of the present disclosure.

Additionally, or alternatively, referring now to FIGS. 12 through 14, exemplary superelastic members 108 are depicted installed in a gas turbine engine in accordance with still other exemplary embodiments of the present disclosure. The turbofan engines 10 depicted in FIGS. 12 through 14 may be configured in substantially the same manner as exemplary turbofan engine 10 described above with reference to FIGS. 1 through 3, and accordingly, the same or similar numbers refer to the same or similar part.

Referring to FIGS. 12 through 14, the turbofan engine 10 includes a forward bearing 84 and an aft bearing 86, each supporting the HP shaft 34. The forward and aft bearings 84, 86 are supported by a support element 88 attached to a static frame 82 at a first location 100 of the static frame 82. Additionally, the aft bearing 86 is supported by a squeeze film damper 96 attached to the static frame 82 at a second location 102 of the static frame 82, the second location 102 being spaced from the first location 100. Additionally, the turbofan engine 10 includes a superelastic member 108 formed of a shape memory alloy supporting at least one of the support element 88 or the bearing, and installed in a pre-stressed condition.

Referring specifically to the embodiment of FIG. 12, the superelastic member 108 is attached to the static frame 82 also at the first location 100 and supports the support element 88. The superelastic member 108 extends between a first end 116, which is attached to the static frame 82 at the first location 100, and a second end 118. The second end 118 is positioned adjacent to the support element 88 at a location forward of the aft bearing 86, and closer to the forward bearing 84. However, in other respects, the superelastic member 108 may function in substantially the same manner as exemplary superelastic member 108 described above with reference to FIGS. 7 through 9.

By contrast, referring now specifically to FIG. 13, the superelastic member 108 is attached to the support element 88. Specifically, for the embodiment depicted, an attachment section 116 of the superelastic member 108 is attached directly to the support element 88, proximate the first location 100 of the static frame 82 using a plurality of bolts. However, in other embodiments, the superelastic member 108 may instead be attached to the support element 88 in any other suitable manner.

Further, referring now particularly to FIG. 14, the superelastic member 108 is attached to the static frame 82 at the second location 102 and supports the aft bearing 86. The exemplary superelastic member 108 of FIG. 11, similar to the exemplary superelastic member 108 of FIGS. 2 through 5, includes an attachment section 110, a bend section 114, and a support section 112. The support section 112 is positioned between an axial member 94 of the support element 88 and the bearing. Accordingly, the axial member 94 of the support element 88 is, in turn, positioned between the squeeze film damper 96 and the support section 110 of the superelastic member 108. With such an embodiment, the superelastic member 108 directly supports the aft bearing 86.

In still other embodiments, however, the superelastic member 108 may have any other suitable configuration for supporting at least one of the support element 88 or a bearing. For example, in other embodiments, the superelastic member 108 may be positioned to support one or more bearings for supporting a forward end 80 of an LP shaft, an aft end of the LP shaft, or an aft end of the HP shaft 34. Additionally, it should be appreciated that in other embodiments the turbofan engine 10 may have any other suitable configuration. For example, the support element 88 may be configured in any other suitable manner, and attached to a static frame 82 in any other suitable manner for providing the benefits described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
   a compressor section and a turbine section arranged in serial flow order;
   a shaft rotatable with at least a portion of the compressor section and with at least a portion of the turbine section;
   a bearing supporting rotation of the shaft;
   a support element supporting the bearing; and
   a superelastic member formed of a shape memory alloy supporting at least one of the support element or the bearing,
   wherein the superelastic member is installed in a pre-bent and pre-stressed condition.

2. The gas turbine engine as claimed in claim 1,
   wherein the gas turbine engine defines a radial direction and a centerline axis,
   wherein the superelastic member provides a force along the radial direction towards the centerline axis during operation of the gas turbine engine.

3. The gas turbine engine as claimed in claim 1, further comprising:
   a squeeze film damper for providing dampening of the bearing,
   wherein at least a portion of the superelastic member is positioned between the squeeze film damper and the bearing.

4. The gas turbine engine as claimed in claim 3, further comprising:
   a static frame,
   wherein the support element is attached to the static frame at a first location,
   wherein the squeeze film damper is attached to the static frame at a second location, and
   wherein the superelastic member is also attached to the static frame at the second location.

5. The gas turbine engine as claimed in claim 1, further comprising:
   a static frame located within the compressor section of the gas turbine engine,
   wherein the support element is attached to the static frame, and
   wherein the superelastic member is also attached to the static frame.

6. The gas turbine engine as claimed in claim 5,
   wherein the superelastic member comprises an attachment section attached to the static frame, a support section for supporting the bearing, and a bend section extending between the attachment section and the support section,
   wherein the bend section defines a U-shape in the pre-stressed condition.

7. The gas turbine engine as claimed in claim 6,
wherein the support element is positioned adjacent to the bearing, and
wherein the support section of the superelastic member is positioned adjacent to the support element.

8. The gas turbine engine as claimed in claim 5,
wherein the support element is attached to the static frame at a first location,
wherein the superelastic member is attached to the static frame at a second location, and
wherein the first location is spaced from the second location.

9. The gas turbine engine as claimed in claim 5,
wherein the support element is attached to the static frame at a first location, and
wherein the superelastic member is also attached to the static frame at the first location.

10. The gas turbine engine as claimed in claim 9,
wherein the support element includes an axial member positioned at least partially adjacent to the bearing, and
wherein the superelastic member is attached to the axial member of the support element.

11. The gas turbine engine as claimed in claim 1, wherein the support element is a squirrel casing for the bearing.

12. The gas turbine engine as claimed in claim 1,
wherein the bearing is an aft bearing,
wherein the gas turbine engine further comprises a forward bearing, and
wherein the support element additionally supports the forward bearing.

13. The gas turbine engine as claimed in claim 1,
wherein the gas turbine engine defines a circumferential direction, and
wherein the superelastic member comprises a plurality of superelastic members spaced along the circumferential direction, each of the plurality of superelastic members formed of a shape memory alloy supporting at least one of the support element or the bearing and installed in a pre-bent and pre-stressed condition.

14. A support assembly for a bearing supporting a shaft within a gas turbine engine, the support assembly comprising:
a support element for supporting the bearing;
a first damper for dampening loads on the bearing; and
a superelastic member formed of a shape memory alloy and configured for supporting at least one of the support element or the bearing,
wherein the superelastic member is configured to be installed in a pre-bent and pre-stressed condition.

15. The support assembly as claimed in claim 14, wherein the first damper is a squeeze film damper.

16. The support assembly as claimed in claim 15, wherein at least a portion of the superelastic member is positioned at least partially adjacent to the squeeze film damper.

17. The support assembly as claimed in claim 16, wherein the superelastic member is positioned at least partially between the squeeze film damper and the support element.

18. The support assembly as claimed in claim 14, wherein the superelastic member comprises an attachment section, a support section, and a bend section extending between the attachment section and the support section.

19. The support assembly as claimed in claim 18, wherein the bend section defines a U-shape in the pre-stressed condition.

20. The support assembly as claimed in claim 14,
wherein the support element includes an axial member, and
wherein the superelastic member is attached to the axial member of the support element.

* * * * *